(12) United States Patent
Wood (10) Patent No.: US 9,734,511 B2
(45) Date of Patent: Aug. 15, 2017

(54) TEMPORARY WORKSPACE ASSIGNMENT

(71) Applicant: International Business Machines Corporation, Armonk, NY (US)

(72) Inventor: Douglas A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/546,613

(22) Filed: Nov. 18, 2014

(65) Prior Publication Data

US 2016/0140591 A1    May 19, 2016

(51) Int. Cl.
| | | |
|---|---|---|
| *G06Q 30/02* | (2012.01) | |
| *G06Q 10/02* | (2012.01) | |
| *G06N 5/02* | (2006.01) | |

(52) U.S. Cl.
CPC ........... *G06Q 30/0206* (2013.01); *G06N 5/02* (2013.01); *G06Q 10/02* (2013.01)

(58) Field of Classification Search
CPC ...... G06Q 10/06; G06Q 10/02; G06Q 10/025; G06Q 10/0631; G06Q 50/163; G06Q 30/0206; G06F 17/5004; G06N 5/02
See application file for complete search history.

(56) References Cited

U.S. PATENT DOCUMENTS

| | | |
|---|---|---|
| 2005/0144025 A1 | 6/2005 | Katz et al. |
| 2006/0224427 A1 | 10/2006 | Salmon |
| 2008/0109289 A1 | 5/2008 | Vivadelli et al. |

(Continued)

FOREIGN PATENT DOCUMENTS

| | | |
|---|---|---|
| WO | WO 2006/081186 A2 | 8/2006 |
| WO | WO 2010/014923 A1 | 2/2010 |
| WO | WO 2010/129913 A1 | 11/2010 |

OTHER PUBLICATIONS

Lindkvist et al.; Ttl: Pervasive technologies for workspace management; Journal Ttl: Journal of Facilities Management, vol. 7, No. 2, pp. 98-110; 2009; Publisher: Emerald Group Publishing, Limited; Country of Publication: UK; ISSN: 14725967; Database: ABI/INFORM.

(Continued)

*Primary Examiner* — Andrew Tank
(74) *Attorney, Agent, or Firm* — Scully, Scott, Murphy & Presser, P.C.; David Zwick, Esq.

(57) ABSTRACT

There are provided a system, a method and a computer program product for assigning a workspace. The system receives one or more reservation request for the workspace, associated with one or more facilities including one or more workspace areas. Each workspace area includes one or more workspaces. The system receives inputs including one or more of: weather condition data, occupancy rates data, and date data, associated with the one or more facilities. The system predicts an energy cost for each workspace area. The system determines a user desirability value for the each workspace area. The system determines a minimum cost for operating the one or more facilities, which satisfies the received reservation request. The system selects one or more workspace area in the one or more facilities according to the determined minimum cost and the received reservation request. The selected workspace area has maximum user desirability values.

11 Claims, 8 Drawing Sheets

(56) References Cited

U.S. PATENT DOCUMENTS

| | | |
|---|---|---|
| 2008/0183483 A1 | 7/2008 | Hart |
| 2009/0193217 A1 | 7/2009 | Korecki et al. |
| 2009/0248704 A1 | 10/2009 | Greenwell et al. |
| 2009/0300174 A1 | 12/2009 | Floris et al. |
| 2011/0244798 A1 | 10/2011 | Daigle et al. |
| 2012/0016638 A1 | 1/2012 | McLean et al. |
| 2012/0078667 A1* | 3/2012 | Denker ................ G06Q 10/02 705/5 |
| 2012/0112929 A1 | 5/2012 | Gupta et al. |
| 2012/0317059 A1 | 12/2012 | Joshi et al. |
| 2013/0209108 A1 | 8/2013 | Krishnakumar et al. |

OTHER PUBLICATIONS

"Tririga Workplace Enterprise—Class Applications," 2011 Tririga, Inc. an IBM Company.

Anonymous Inventors; Ttl: Method and System for Optimizing Allocation of Temporary Workspaces; Jul. 1, 2013; Database: ip.com; ip.com No. IPCOM000228728D.

* cited by examiner

| 600 | | | | |
|---|---|---|---|---|
| EXTERNAL TEMPERATURE RANGE 605 | | | | |
| AMOUNT OF CLOUD COVERAGE 610 | | | | |
| HOURS OF SUNLIGHT 615 | | | | |
| HEIGHT OF SUN IN THE SKY 620 | | | | |
| PERCENT OF OCCUPANCY 625 | | | | |
| DAY OF WEEK 630 | | | | |
| ADVANCED RESERVATION 635 | | | | |
| TOTAL NUMBER OF CUBICLES NEEDED 640 | | | | |
| MAXIMUM NUMBER OF CONFERENCE ROOMS NEEDED 645 | | | | |
| 10% EXCESS CAPACITY TO COVER INACCURACY OF ADVANCED RESERVATION 650 | | | | |
| PERCENT OF CANCELLATIONS 655 | | | | |
| AREA COST (DERIVED FROM HISTORICAL DATA) 660 | AREA 1 (# OF MAXIMUM OCCUPANCIES: XX) | ACTIVE 670 | | |
| | | DORMANT 675 | | |
| | AREA 1 (# OF MAXIMUM OCCUPANCIES: XXX) | ACTIVE | | |
| | | DORMANT | | |
| | ... | | | |
| USER DESIRABILITY 680 | AREA 1 | | | |
| | AREA N | | | |

|  |  | USER DESIRABILITY  *680* |
|---|---|---|
| ZONE 1 | CUBICLE 1 |  |
|  | CUBICLE 2 |  |
|  | ... |  |
|  | CUBICLE N |  |
| ... |  |  |
|  |  |  |
|  |  |  |
|  |  |  |
| ZONE N | CUBICLE 1 |  |
|  | CUBICLE 2 |  |
|  | ... |  |
|  | CUBICLE N |  |

TEMPORARY WORKSPACE ASSIGNMENT

BACKGROUND

This disclosure relates generally to managing facilities, and particularly to assigning temporary workspaces.

BACKGROUND OF THE INVENTION

In facilities management, a facility being a business or any structure having space(s) where operations are conducted and/or where people work/interact, e.g., a "workspace", one goal is analyze and address all types of facility planning. One type of planning addressed in current solutions is to increase facilities utilization, e.g., reduce occupancy and operating costs of those facilities. By using current techniques for modeling and analysis, a facility management entity may currently perform one or more of: (1) project or program management; (2) fund management; (3) cost management; (4) schedule management; (5) resource management; (6) quality management; (7) vendor engagement; (8) procurement, etc.

A current facilities management solution, such as provided by IBM's TRIRIGA®, provides software and hardware solutions that supports mobile workers who work temporarily at different facilities at different times, facility portfolio management and reduction of occupancy costs. By using these solutions, facilities may reduce their operating costs, and energy usage and maintenance costs. By using the solutions, facilities may increase facility utilization, increase employee productivity, and mitigate environmental risks.

Such current facilities management techniques are currently implemented to assign temporary workspaces in one or more facility to maximize a "quality" (e.g., a user satisfaction level, etc.) of each workspace while minimizing a cost of operating the facility. Many originations (e.g., companies, etc.) have facilities that are designed to provide temporary workspace for mobile workers (i.e., workers who work in a plurality of locations). Temporary workspaces benefit the organizations because the temporary workspaces utilize an available space(s). The temporary workspaces benefit the mobile workers because the mobile workers can get workspaces in any geographic area that the workers happen to be working in as long as there is a facility available that supports a temporary workspace assignment.

For facilities whose primary role is to provide temporary workspaces, there are unique opportunities for optimization since the most efficient utilization of workspaces in the facilities can be recalculated each day. If on a given day, a facility is less than fully utilized, then an operating cost of that facility can be reduced by deactivating an unused portion of the facility. Cost savings can be achieved if one or more sections of the facility is deactivated, e.g., provided with no electric power, no water, and no gas. The deactivated sections may be either the most expensive to operate or the least desirable workspaces, .e.g., workspace located at farthest from a restroom, an elevator, etc.

SUMMARY

There are provided a system, a method and a computer program product for assigning a workspace. The system receives one or more reservation request for the workspace, associated with one or more facilities including one or more workspace areas. Each workspace area includes one or more workspaces. The system receives inputs including one or more of: weather condition data, occupancy rates data, and date data, associated with the one or more facilities. The system predicts, based on the received inputs and the received reservation request, an energy cost for each workspace area. The system determines a user desirability value for the each workspace area. The system determines, based on the predicted energy cost and the determined user desirability value, a minimum cost for operating the one or more facilities, which satisfies the received reservation request. The system selects one or more workspace area in the one or more facilities according to the determined minimum cost and the received reservation request. The selected workspace area has maximum user desirability values.

In order to predict the energy cost of each workspace area, the system runs a learning algorithm in order to find a match between the received inputs and the received reservation request and historical data which includes one or more of: historical weather condition data, historical occupancy rates data, historical date data, and historical reservation request. The system derives, based on the found match, the energy cost which corresponds to the matched historical data. The derived energy cost is the predicted energy cost.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

A computing system (e.g., a computing system shown in FIG. 2) assigns one or more workspaces in a facility (e.g., building or areas therein) or in a group of facilities while minimizing the cost of running the facility and maximizing comfortability of users based on a combination of a prediction of the daily environmental conditions (e.g., weather and cloud coverage), historical operation cost of the facility and user desirability values (i.e., ratings of satisfactions of workspaces that each user used).

Figure 4A:
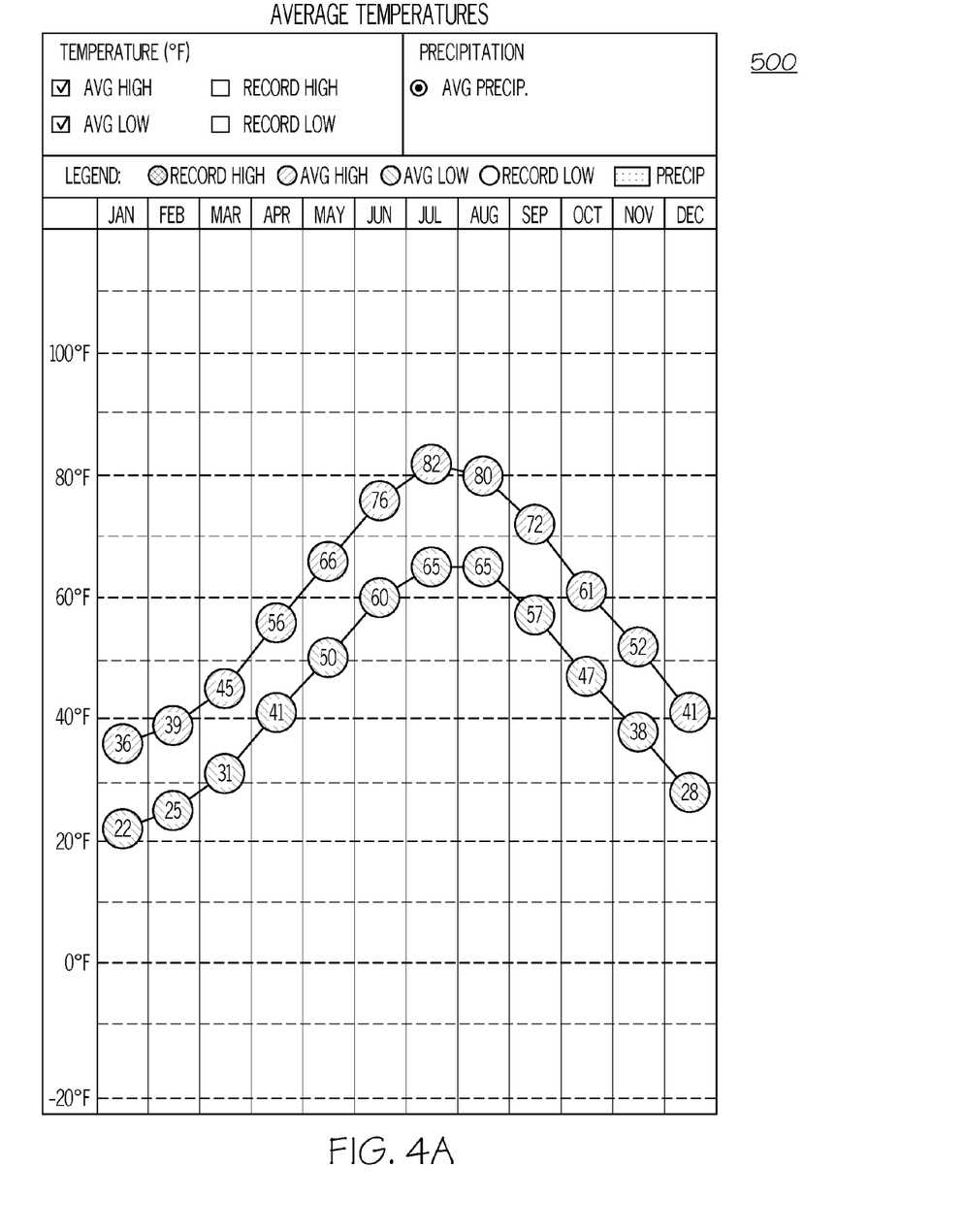
FIG. 4A illustrates a table indicating average temperatures in one embodiment.
Figure 4B:
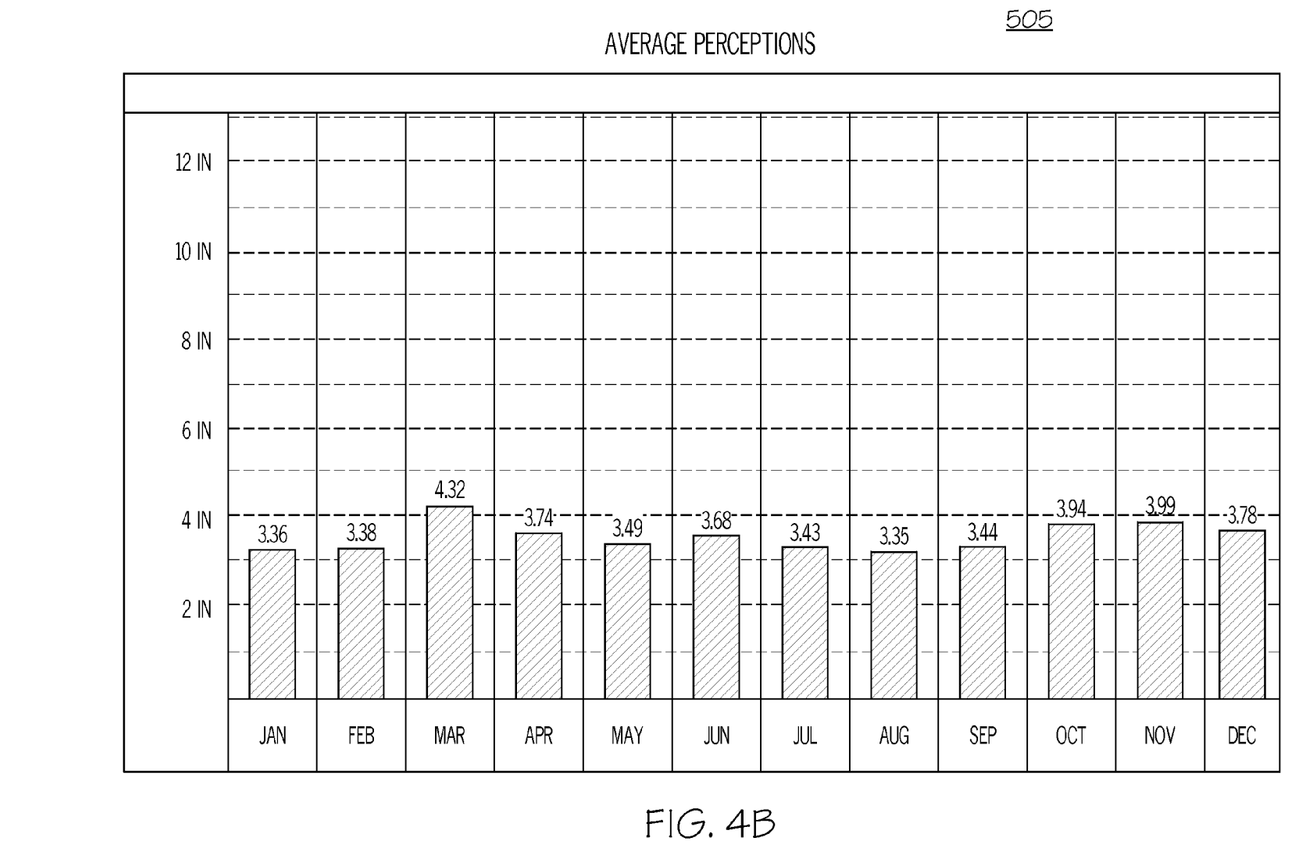
FIG. 4B illustrates a table indicating average perceptions in one embodiment.
Figure 5:
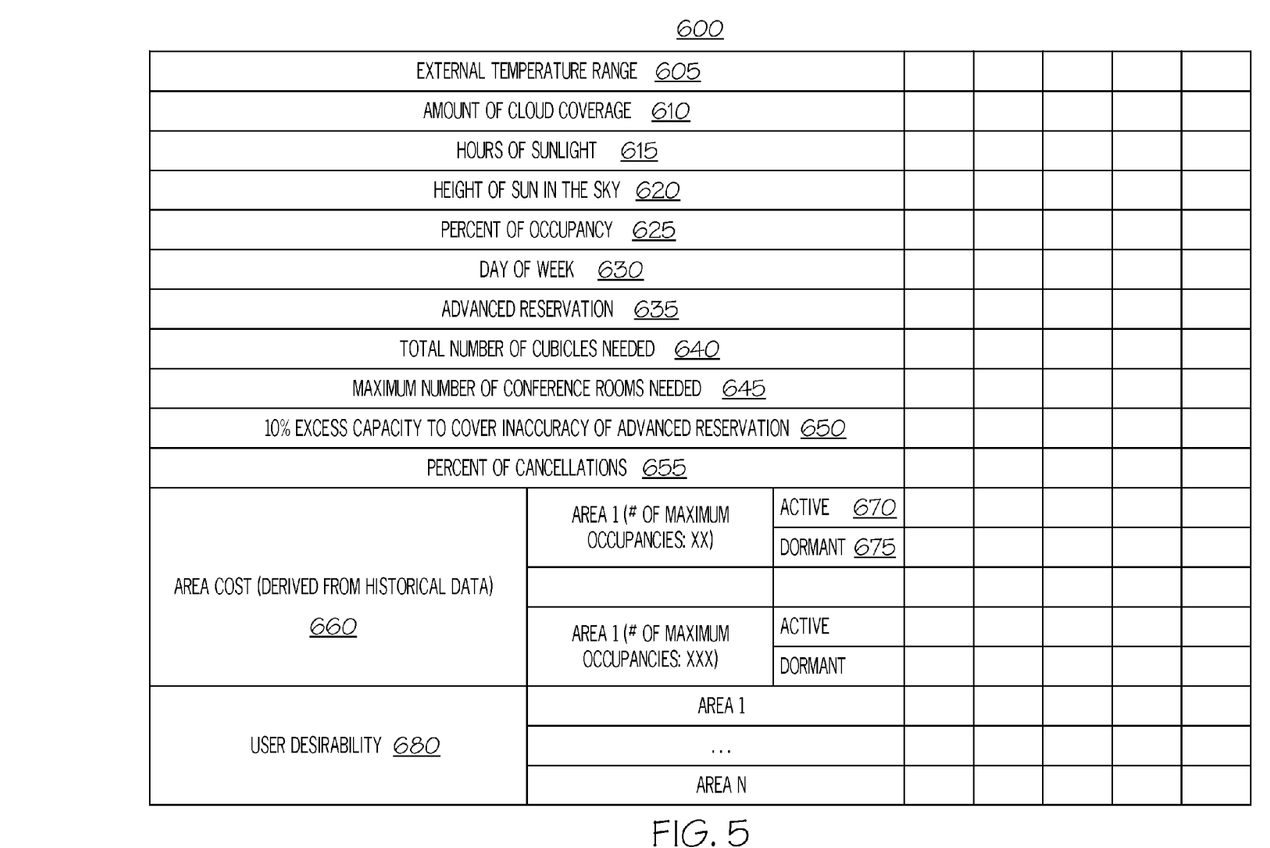
FIG. 5 illustrates a zone cost table in one embodiment.

In one embodiment, a workspace area cost table 600 is shown in FIG. 5. The computing system creates the workspace area cost table 600 by receiving data of historical daily conditions (weather and cloud coverage), the historical operation cost of the facility, and the user desirability values. The computing system runs a learning algorithm (e.g., a supervised learning algorithm and/or a decision tree algorithm, etc.) over the workspace area cost table 600. The run learning algorithm outputs a workspace area operation cost (e.g., area operating costs 670-675, etc.) corresponding to specific daily conditions. For example, the workspace area cost table 600 includes historical data which includes, but is not limited to: outside temperature ranges 605 as shown in a table 500 in FIG. 4A, amounts of cloud coverage 610, hours of sunlight 615, heights of sun in a sky 620, perceptions as shown in a table 505 in FIG. 4B, a percent of occupancy 625, a day of week 630, an advanced reservation for workspaces in the each work space area 635, a total number of workspaces needed 640, a maximum number of conference rooms needed 645, 10% excess capacity to cover inaccuracy of the advanced reservation or to cover walk-in 650, a percentage of cancellations 655, an energy cost (or operating cost) 660 when a corresponding workspace area is dormant 670 (i.e., when that corresponding workspace area is occupied by no user; a pre-configured minimum level of energy usage), an energy cost (or operating cost) when that corresponding workspace area is active 675 (i.e., when that corresponding workspace area is occupied by at least one user), and a user desirability value. Based on this workspace area cost table 600, upon meeting same or similar daily conditions (e.g., similar weather conditions, similar advance reservation conditions, and similar percentage of cancellations, etc.), the computing system can determine a corresponding energy cost (or a corresponding operating cost) of each workspace area of each workspace area. The determined energy cost is historical energy cost corresponding to same or similar historical daily conditions.

The following describes example characteristics of example workspace areas. A workspace area 11A has a front lobby, administrate offices, 100 cubicles for workspace assignments, three conference rooms, and one conference area. Each of workspace areas 11B, 21A, 21B, and 31A has 400 open cubicles, seven conference rooms and one conference area. Each of workspace areas 12A, 22A, and 32A has 300 cubicles and nine conference rooms. Each of areas 13A, 13B, 23A, 23B, and 33A include various services including raised floor data centers and are always active, and are not used for workspace assignments. An area 35A has the cafeteria, a conference area, and 75 cubicles for workspace assignments.

The following further describes example historical data which may be represented in the workspace area cost table 600 in FIG. 5. Each of workspace areas 11A, 11B, 21A, 21B, and 31A has south facing windows. On clear summer days (i.e., summer days with no cloud in the sky), these workspaces are expensive to cool (i.e., requires cooling cost higher than a threshold value). On the clear summer days, the $3^{rd}$ floor of workspace area 31A receives the lowest user desirability value due to complaints of hot room temperatures (e.g., hotter than 75° F.). On the clear summer days, in these workspaces, lighting receives a minimal help from sunlight because the sun angle is higher than a threshold value.

The workspace area cost table 600 correlates the historical data 605-650 of each workspace area with a dormant energy cost 675 of the each workspace area. The workspace area cost table 600 correlates the historical data 605-650 of each workspace area with an active energy cost 670 of the each workspace area. Given a set of specific empirical conditions (e.g., specific weather conditions and specific reservation conditions, etc.), based on the workspace area cost table 600, the computing system can determine a dormant or active energy cost of each workspace area.

Figure 6:
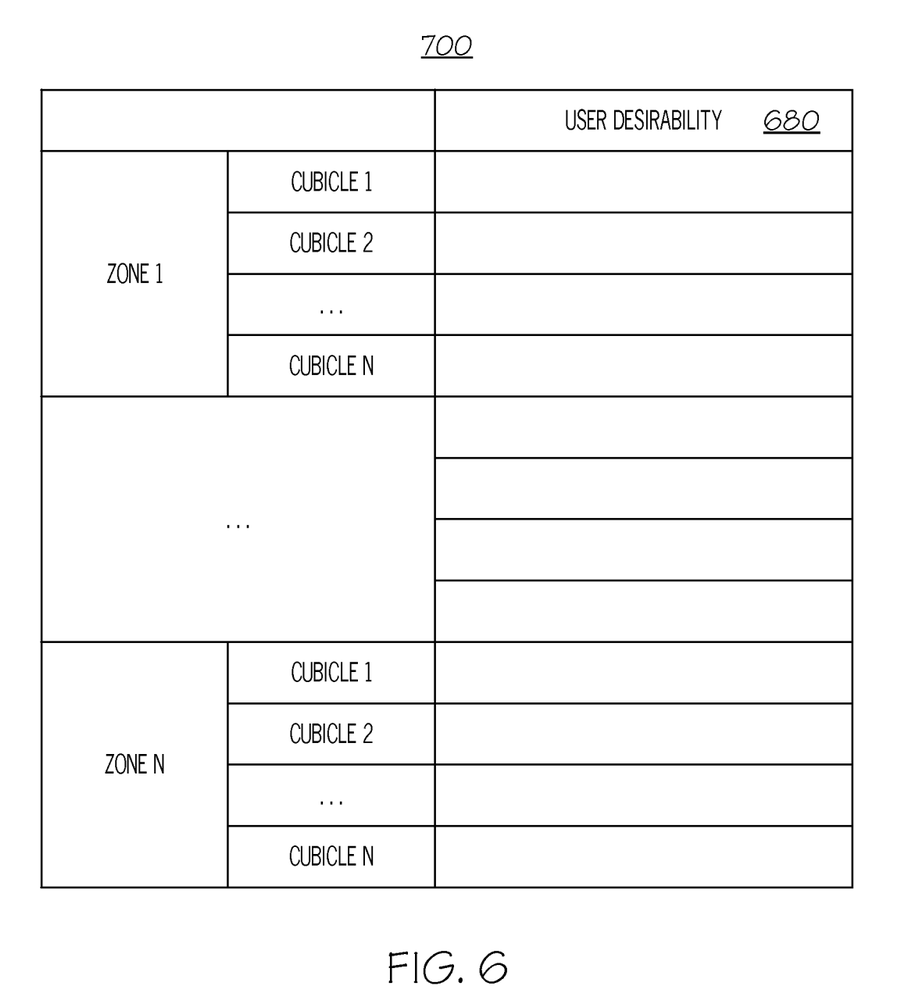
FIG. 6 illustrates a user desirability table in one embodiment.

In one embodiment, there is provided a user desirability value table 700 as shown in FIG. 6. The user desirability table 700 illustrates a user desirability value 680 of each workspace in each workspace area. After using a workspace, a corresponding user receives a survey that includes, but is not limited to: a rating of comfortability, a rating of an access to amenities, and a rating of satisfaction of that workspace, etc. If one or more occupancy sensors (i.e., a control device that detects an occupancy within an area) are capable of determining utilization of a corresponding workspace area, then a workspace area usage and/or the number of assigned workspaces in the workspace area can be factors to determine a user desirability value of the corresponding workspace area.

In another embodiment, the computing system uses any energy modeling tool (e.g., an energy modeling tool from Apogee Wausau Group, Inc., etc.) that is used in a facility design to augment the learning algorithm, especially when there exists no or few historical data to run the learning algorithm.

An angle of sunlight entering a facility may also be a factor to determine a user desirability value and an energy cost of that facility. The computing system may calculate this angle of sunlight based on a current date and latitude of that facility. The lower the sun in the sky, the smaller the angle of sunlight, and consequently more solar heating, and the more issues with glares.

The computing system may improve quality of workspaces, e.g., by adjusting factors under a direct or indirect (through work orders) control of a control system which controls and maintains a facility which includes the workspaces. The most efficient or most comfortable occupancy of a workspace area may be less than the maximum occupancy of that workspace area.

By assigning a workspace by running the learning algorithm over the historical data in the workspace area cost table 600, the computing system arranges workspaces so that each user has an access to services provided by the facility and is provided with a maximum comfortability (i.e., maximum user desirability values). At the same time, the computing system minimizes resource usages and energy cost (or operating cost) of the facility, e.g., by operating only workspace areas which satisfies a daily demand and requires minimum energy costs.

The computing system selects workspace areas to be operated based on static empirical data and/or transient factors, which include, but is not limited to: historical data 605-680 shown in the table 600 in FIG. 5. For example, the historical data in the table 600 may indicate that in a facility with south facing windows, workspaces near the windows may overheat on clear summer days and be cold and drafty on cloudy winter day, but can be considered desirable (e.g., corresponding user desirability value is higher than a threshold) on cloudy summer days and sunny winter days. The table 600 may further indicate that the energy cost of the workspace near the windows for heating and cooling as well as lighting varies with different weather conditions. Then, based on the energy cost and the user desirability values, the computing system may select the workspace near the south facing windows to be operated on cloudy summer days and sunny winter days. For example, the computing system selects one or more workspaces that can satisfy the reservation request. The selected workspaces may need a minimum operating cost according to the table 600 in FIG. 5.

Figure 1:
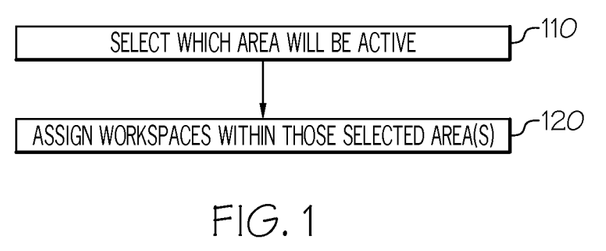
FIG. 1 illustrates a flowchart that describes method steps for managing one or more facilities which include one or more workspaces in one embodiment.
Figure 3:
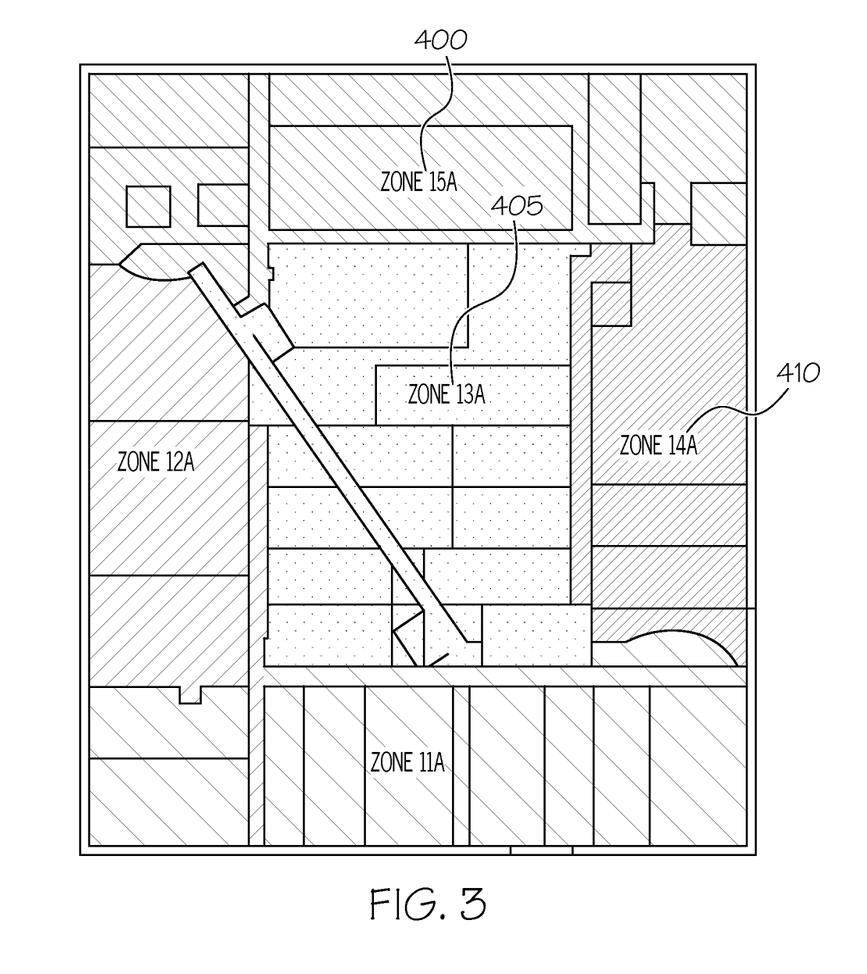
FIG. 3 illustrates example workspace zones in one embodiment.

A facility or a group of facilities may be wholly or partially used for workspaces. A facility may include a plurality of workspace areas as shown in FIG. 3. FIG. 3 illustrates example workspace areas, e.g., a workspace area represented by zone 15A (400), a workspace area represented by zone 13A (405), a workspace area represented by zone 14A (410), etc. The computing system assigns workspaces on a daily basis, e.g., by running a method shown in FIG. 1. FIG. 1 is described in detail below. More than one HVAC (Heating, Ventilation, and Air Conditioning) and lighting are used for in workspace areas. There may be provided sensors in each workspace area which measure an actual cost of the HVAC and the lighting on a daily basis. The computing system may deliver a different level of services to each workspace area based on occupancy of each workspace area. For example, the higher occupancy, the more energy costs to spend on the HVAC and lighting. There may be further provided in each workspace area with an occupancy sensor that determines occupancy of a corresponding workspace area.

During operations of workspace areas, the computing system monitors, e.g., by using one or more sensors, etc., the following on a daily basis: (1) an outside temperature (these temperatures may also be available in daily weather forecast information) of each workspace area; (2) an amount of sunlight penetrated to each workspace area (or an amount of cloud coverage in a sky) (these amounts may also be available in daily weather forecast information); (3) the number of advanced reservations of workspaces needed; (4) a percent of advanced reservations that are cancelled; (5) the number of walk-in reservations for workspaces; (6) a percent utilization of each workspace area; and/or (7) an energy used by each workspace area, etc.

The system may provide an Internet based portal for workspace reservation. Each facility may also include a kiosk for walk-in workspace requests. Each day before a facility opens, but after weather forecast data is available, the computing system runs a method shown in FIG. 1 in order manage one or more facilities which include one or more workspaces. At 110 in FIG. 1, the computing system receives one or more reservation request for the workspace, associated with one or more facilities including one or more workspace areas. Each workspace area includes one or more workspaces. The computing system further receives one or more types of input data, which include but are not limited to: weather condition data, occupancy rates data, and date data, associated with the one or more facilities. In one embodiment, in order to receive the input data and the reservation request, the computing system retrieves, from one or more database, the weather condition data, the occupancy rates data, the date data, and the reservation request.

The weather condition data represents conditions external to the one or more facilities. These represented conditions includes, but is not limited to: an outside temperature range and an amount of cloud coverage in a sky. The date data includes, but is not limited to: an amount of a shade made by one or more building nearby the one or more facilities, an angle of sunlight relative to a horizon, and a duration of sunlight. The reservation request includes, but is not limited to: an advanced reservation for workspaces, an expected number of walk-in reservations on a corresponding day of a week, the number of particular types of workspaces needed, and a total number of workspaces needed, etc. In one embodiment, the received one or more types of input data and the reservation request reflect past, current and/or future daily conditions (e.g., weather conditions, reservation conditions, etc.) associated with the facilities.

The computing system predicts, based on the received one or more types of input data and the received reservation request, all the conditions that may exist in the facilities for a corresponding day. The conditions to be predicted include, but are not limited to: a dormant and an active energy cost for each workspace area, the number of cancellations to be made for the corresponding day, etc. In order to predict those conditions, the computing system runs the learning algorithm with the received one or more types of input data and the received reservation request, to determine historical data which corresponds to the received input data and the received reservation request. In one embodiment, the computing system runs a supervised learning algorithm or a decision tree algorithm in order to find a match between the received input data and the received reservation request and historical data which includes one or more of: historical weather condition data (e.g., historical weather condition data 605-610 shown in the table 600 in FIG. 5), historical occupancy rates data (e.g., historical occupancy rate data 625 shown in the table 600 in FIG. 5), historical date data (e.g., historical date data 615-620 shown in the table 600 in FIG. 5), and historical reservation request (e.g., historical reservation request 635-640 shown in the table 600 in FIG. 5). The computing system derives, based on the found match, those conditions which corresponds to the matched historical data. In one embodiment, a historical energy cost, which corresponds to the matched historical data, is the predicted energy cost that corresponds to the received data and the received reservation request. In one embodiment, the historical number of cancellations (or the historical percentage of cancellations), which corresponds to the matched historical data, is the predicted number of cancellations for the corresponding day.

In one embodiment, the computing system optimizes the prediction of all the conditions to be existed in the facilities, e.g., by using a heuristic to identify which historical data have a higher correlation to the received input data and the reservation request than other historical data. For example, the computing system determines the correlation, e.g., by calculating correlation coefficients between values of one or more historical data and values of the received input data and the received reservation request. Less value of a coefficient, less correlation between corresponding historical data and corresponding received input data and/or corresponding received reservation request.

Figure 7:
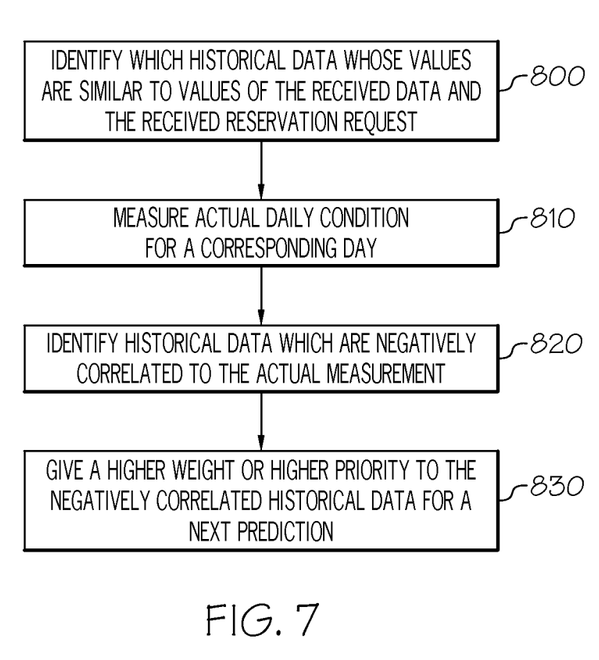
FIG. 7 illustrates a flowchart that describes method steps for optimizing a prediction of conditions to be existed in the facilities for a corresponding day in one embodiment.

FIG. 7 illustrates a flowchart that describes method steps for optimizing a prediction of conditions to be existed in the facilities for a corresponding day in one embodiment. At 800, the computing system identify historical data whose values are most similar to values of the received input data and the received reservation request in order to predict conditions of that corresponding day, e.g., by comparing values of historical data 605-650 in each column of the table 600 to values of the received input data and the reservation request. At 810, the computing system determines actual values of daily conditions (e.g., daily weather condition for the corresponding day, daily cancellation condition for the corresponding day, daily reservation condition for the corresponding day, daily energy cost for the corresponding day, etc.), e.g., by using temperature and/or occupancy sensors associated with the facilities.

At 820, computing system identify historical data whose values are negatively correlated to the values of the actual daily conditions of the corresponding day. A negative correlation may represent that values of corresponding historical data change against (e.g., have a revere relationship with) the values of the actual daily conditions. For example, the computing system may calculate a correlation coefficient between an average of values of each row in the table 600 against each corresponding value of the actual daily conditions of the corresponding day in order to identify the negatively correlated historical data. If a value of a correlation coefficient is less than zero, corresponding historical data and the corresponding actual daily condition are negatively correlated. At 830, the computing gives a higher weight (e.g., a higher priority, etc.) to the negatively correlated historical data when the computing system runs the prediction of daily conditions (e.g., daily energy cost, daily number of reservation cancellations etc.) for another day. For example, if the hours of sunlight 615 in the table 600 is identified as a negatively correlated historical data, the computing system may first compare each value in the hours of sunlight 615 row in the table 600 to a "hours of sunlight" value in the received weather condition data during a prediction of the daily conditions for the another day. The computing system may select three or four columns in the table 600 whose hours of sunlight values are most similar to a value of the hours of sunlight in the received weather condition data of the another day. At the end of the prediction for the another day, the computing system may eventually choose, among the selected columns, one column whose values of other historical data are most similar to the received input data and received reservation request. Values of the historical data in the chosen column in the table 600 may represent predicted values of the daily conditions of the another day.

In one embodiment, in order to predict the active energy cost of each workspace area, the computing system determines, based on the received input data, the received reservation request, and the found matched historical data, the energy cost of the each workspace area when the each workspace area is occupied by at least one user. For example, the historical energy cost, which corresponds to the found matched historical data, is the energy cost of the each workspace area when the each workspace area is occupied by at least one user. In order to predict the dormant energy cost of each workspace area, the computing system determines, based on the received input data, the received reservation request, and the found matched historical data, the energy cost of the each workspace area when the each workspace area is not occupied by any user. For example, the historical energy cost, which corresponds to the found matched historical data, is the energy cost of the each workspace area when the each workspace area is not occupied by any user.

The computing system determines a user desirability value for the each workspace area. In order to determine the user desirability value of each workspace area, the computing system receives, from each user, a survey that includes, but is not limited to: questions asking a user to rate his/her comfortability, rate the workspace's access to amenities, and rate the user's level of satisfaction of a workspace that the user used. Each question may include numerical ratings one of which is chosen by the user. The system sends and collects the survey, e.g., by using an email, a webpage, etc.

An example of the survey may indicate as follows: on a cloudy summer day (i.e., a summer day with a cloud in the sky), these workspace areas 11A, 11B, 21A, 21B, and 31A require comparable cooling cost per sq ft to other workspace areas. On the cloudy summer day, these workspace areas receive user desirability values higher than a threshold value. On a sunny winter day (i.e., a winter day with no cloud in the sky), in these workspace areas, there exist good cost savings on heating due to heating provided from sunlight. On the sunny winter day, in these workspace areas, there exists a reduced lighting cost due to a sunlight angle lower than a threshold. On the sunny winter day, in these workspace areas, window cubicles receive user desirability values lower than a threshold due to sun glare and when these window cubicles are assigned, shades are made and reduces cost savings in the lighting cost. On a cloudy winter day (i.e., a winter day with a cloud in the sky), these workspace areas require energy cost per sq ft which is similar to other workspace areas. On the cloudy winter day, in these workspace areas, there exist complaints about window cubicles being cold.

An another example of the survey may indicate as follows: workspace areas 12A, 22A, and 32A have west facing windows. On clear summer days, these workspaces receive sunlight in the Morning and are cooler than a threshold during a daytime and thus energy costs are less than a threshold. On a cloudy summer day, in these workspace areas, there exist cooling costs per sq ft similar to cooking cost of other workspace areas. On the cloudy summer day, these workspace areas receive user desirability values higher than a threshold. On a sunny winter day, in these workspace areas, there exist cost savings on heating due to sunlight penetrated to these workspace areas. On the sunny winter day, these workspace areas require reduced lighting costs due to a sunlight angle lower than a threshold. On the sunny winter day, in these workspace areas, window cubicles receive user desirability values lower than a threshold due to sun glare and when these window cubicles are assigned, shades are made and reduces cost savings in the lighting and heating costs. On a cloudy winter day, in these workspace areas, there exist energy costs per sq ft similar to energy costs of other workspace areas. On the cloudy winter day, in these workspace areas, there exist complaints about window cubicles being cold.

The computing system determines, based on the predicted energy cost and the determined user desirability value, a minimum cost, for operating the one or more facilities, which satisfies the received reservation request. In one embodiment, in order to determine the minimum cost, the computing system may assign each different weight to each of the received one or more types of input data (e.g., the received weather condition data, the received occupancy rates data, the received date data) and the received reservation data, etc. By running the energy modeling tool with these weighted data and request, the computing system can determine the dormant and active energy cost of each workspace area. In one embodiment, the dormant energy cost of a workspace area represents a minimum cost for operating that workspace area. A dormant workspace area represents a workspace area which is not occupied by any user. An active workspace area represents a workspace area which is occupied by at least one user.

The computing system selects one or more workspace area in the one or more facilities according to the determined minimum cost and the received reservation request. In one embodiment, the selected workspace area has maximum user desirability values. The selected workspaces have enough workspaces that satisfy the received reservation request and may require minimum operating cost according to the table 600 shown in FIG. 5. The computing system may further select extra workspace areas in order to meet walk-in workspace reservation requests. The computing system notifies users, who have made workspace reservations, of workspaces in the selected workspace areas, e.g., by using emails, instant messaging, text messaging, etc. Returning to FIG. 1, at 120, the computing system first assigns workspaces, in the selected workspace area, whose user desirability values are highest to users who have made a workspace reservation at earliest. Then, the computing system assigns workspaces, in the selected workspace area, whose user desirability values are second highest to remaining users who have made workspace reservations later than the earliest users. The workspaces, in the selected workspace area, whose user desirability values are the lowest may be assigned to users who have made workspace reservations at last or who have made walk-in workspace reservations.

A workspace area that is in use by any user becomes an active state, e.g., setting a room temperature to a specific degree, providing lightings, operating elevators or escalators near that workspace area. Unused workspace areas becomes a dormant state, e.g., providing no utility to that unused workspace area. All workspace areas may become dormant (e.g., having no utility available) at the end of a weekday and during a weekend.

Any system that affects either a user desirability value or an operating cost of a workspace area may be added into a determination of an energy cost of that workspace area. An example of this system includes, but is not limited to: automatic window shutters or blinds; and elevators or escalators which can minimize elevator or escalator contention. For example, these systems may be added, e.g., by computing system, etc., to the table 600 as factors (e.g., rows in the table 600) to determine operating costs. For example, the operating cost of these systems will be added to the active operating costs of corresponding workspace areas (also called corresponding workspace zones). As consistent user desirability values of workspaces build, an assignment of a workspace having a user desirability value higher than a pre-determined threshold value can be used to influence behavior of a user who receives the assignment. For example, the computing system assigns workspaces with user desirability values higher than the pre-determined threshold to users who have made workspace reservations in advance and do not have a history of cancellations of workspace reservations, e.g., by using the table 600 and the method shown in FIG. 2. This example assignment may encourage advanced workspace reservation and improve a workspace usage prediction. In another example, the computing system uses user desirability values as like rating used in airplane seat assignments, e.g., by charging premium rates to workspaces with user desirability values higher than the pre-determined threshold value.

In one embodiment, the received data and the reservation request data dynamically change everyday. By running methods shown in FIGS. 1 and/or 7, the computing system assigns one or more workspaces in the selected zones in which the workspace assignments reflect the dynamically changed data and request.

The following describes three example usage scenarios each of which employs the method shown in FIG. 1.

A first example usage scenario: on a clear summer day, there provided a weather forecast—clear high: 85, low: 65. A day of week is Wednesday. The number of advanced reservations is 1720. Predicted cancellation rate is 5%. The predicted number of walk-in workspace reservations is 535. A maximum of four conferences rooms are required. 10% excess capacity of workspace reservations is necessary to cover inaccuracy in the predicted number of walk-in workspace reservations. The total number of cubicles needed is 2575. In order to satisfy these reservation requests, the computing system runs the method shown in FIG. 1 and determines as follows:

(1) Reservation exceeds a threshold (i.e., 1500 number of workspace reservations). A cafeteria shall be fully operated—workspace area 35A shall be active.

(2) Start to assign workspaces in workspaces areas with north facing windows because these workspaces both require the least energy cost and receive the highest user desirability value on sunny summer days.

(3) Activate (e.g., provide utility in) a workspace area 11A which provides 75 workspaces.

(4) Activate a workspace areas 15A, 25A, 25B, 35A, all of which provide 900 cubicles and four conference rooms.

(5) Activate a workspace area 34A with a cafeteria (workspace area 34A provides 300 cubicles).

(6) On summer days, workspaces with east facing windows require next cheapest energy costs. Energy cost to operate workspaces in a facility A is cheaper than in facility B due to shadowing of the facility A from sunlight in the Morning by the facility B. A workspace area 14A has a class room that is not used and a reduced number of cubicles in the workspace area 14A increases energy cost per cubicle.

(7) Activate a workspace area 24A—$2^{nd}$ floor break room space increase user desirability value of the workspace area 24A; the workspace area 24A provides 300 cubicles.

(8) Activate a workspace area 14A whose average user desirability is lower than a threshold but whose energy cost is next cheapest; the workspace area 14A provides 250 cubicles.

(9) There is an incremental saving when adjacent workspace areas are active due to preventing of an isolation of an active workspace area. Activate a workspace area 14A because the workspace area 14A is adjacent to other active workspace areas; the workspace area 14A provides 400 cubicles.

(10) Activate a workspace area 32A for the remaining cubicles due to its proximity to the cafeterias; the workspace area 32A provides 400 cubicles.

(11) One or more of the remaining workspace areas are closed (i.e., become dormant).

A second example usage scenario: on a clear winter day, there are provided with a weather forecast—clear high: 17, low: −12. A day of week is Monday. The number of advanced reservations is 832. The predicted cancellation rate is 15%. The number of predicted walk-ins workspace reservations is 841. A maximum of four conferences rooms are required. 10% excess capacity of workspace reservations is necessary to cover inaccuracy in the predicted number of walk-in workspace reservations. The total number of cubicles needed is 1978. In order to satisfy these reservation requests, the computing system runs the method shown in FIG. 1 and determines as follows:

(1) Reservation exceeds a threshold (i.e., 1500 number of workspace reservations). A cafeteria shall be fully operated—workspace area 35A shall be active.

(2) Start to assign workspaces in workspace areas having south facing windows because these workspaces benefit most from sun heating and an angle of sunlight (lower than a threshold) reduces lighting requirements.

(3) Activate a workspace area 11A which provides 75 cubicles.

(4) Activate workspace areas 11b, 21A, 21B, 31A, all of which provide 1600 cubicles and four conference rooms.

(5) Activate a workspace area 34A with a cafeteria (workspace area 34A provides 300 cubicles).

(6) Assign cubicles near windows at last because user desirability values of these cubicles are the lowest.

A third example usage scenario: on a snowy winter day, there are provided with a weather forecast—clear high: 28, low 15, Morning snow. A day of week is Thursday. The number of advanced reservations is 542. The predicted cancellation rate is 30%. The number of predicted walk-ins workspace reservations is 256. A maximum of two conferences rooms are required. 10% excess capacity of workspace reservations is necessary to cover inaccuracy in the predicted number of walk-in workspace reservations. The total number of cubicles needed is 1978. In order to satisfy these reservation requests, the computing system runs the method shown in FIG. 1 and determines as follows:
(1) Reservation exceeds a threshold (i.e., 1500 number of workspace reservations). A cafeteria shall be fully operated—workspace area 35A shall be active.
(2) Start to assign workspaces in workspace areas having south facing windows because these workspaces benefit most from sun heating and an angle of sunlight (lower than a threshold) reduces lighting requirements.
(3) Activate a workspace area 11A which provides 75 cubicles.
(4) Activate workspace areas 11b, 21A, 21B, 31A, all of which provide 1600 cubicles and four conference rooms.
(5) Activate a workspace area 34A with a cafeteria (workspace area 34A provides 300 cubicles).
(6) Assign cubicles near windows at last because user desirability values of these cubicles are the lowest.

Figure 2:
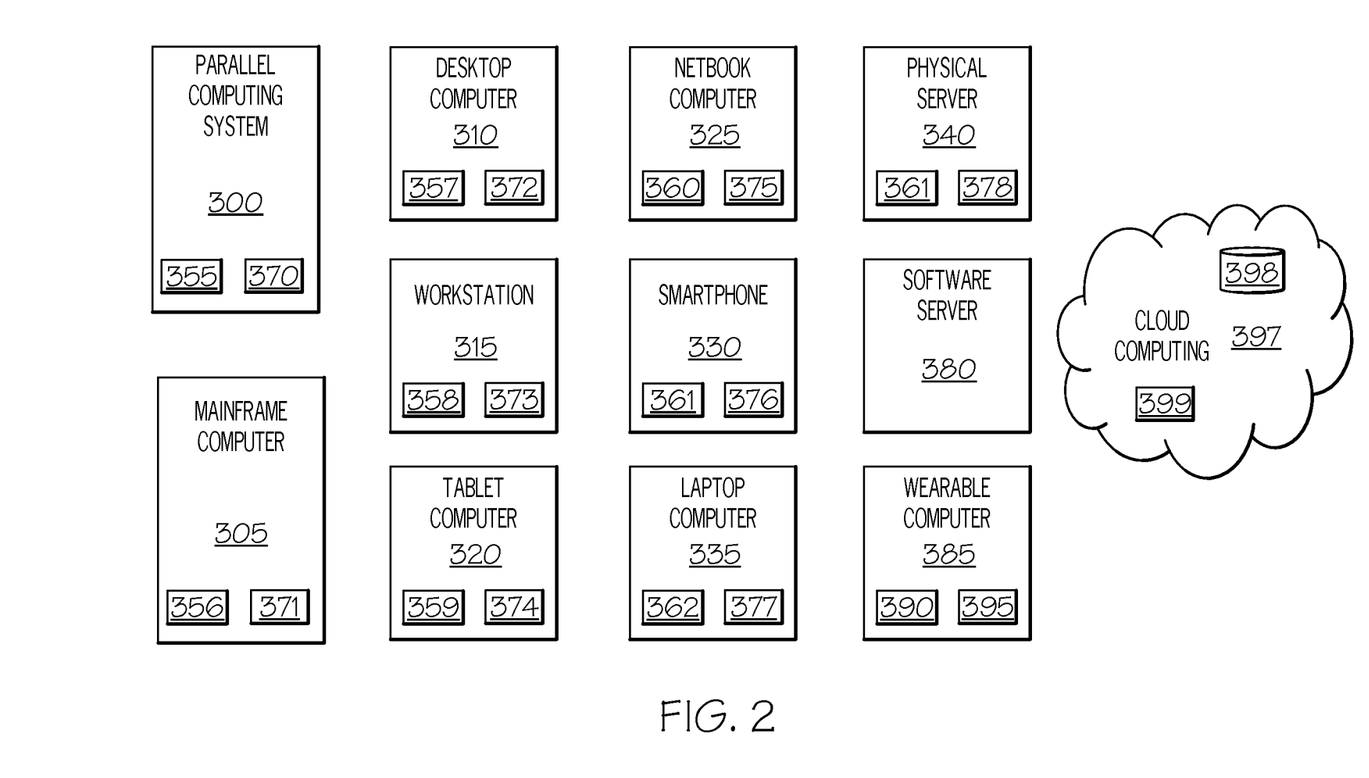
FIG. 2 illustrates exemplary hardware configurations for performing method steps shown in FIG. 2 in one embodiment.

In one embodiment, a computing system may run the method illustrated in FIG. 1. FIG. 2 illustrates examples of the computing system. Examples of the computing system may include, but are not limited to: a parallel computing system 300 including at least one processor 355 and at least one memory device 370, a mainframe computer 305 including at least one processor 356 and at least one memory device 371, a desktop computer 310 including at least one processor 357 and at least one memory device 372, a workstation 315 including at least one processor 358 and at least one memory device 373, a tablet computer 320 including at least one processor 356 and at least one memory device 374, a netbook computer 325 including at least one processor 360 and at least one memory device 375, a smartphone 330 including at least one processor 361 and at least one memory device 376, a laptop computer 335 including at least one processor 362 and at least one memory device 377, a physical server 340 including at least one processor 361 and at least one memory device 378, a software server 380, e.g., web server, HTTP server, application server, or a wearable computer 385, e.g., smartwatch, etc., including at least one processor 390 and at least one memory device 395.

In one embodiment, the methods shown in FIG. 1 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 1 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for assigning a workspace, the method comprising:
   receiving, at a hardware processor, one or more reservation requests for the workspace associated with one or more facilities including one or more workspace areas, each workspace area including one or more workspaces;
   receiving, at the processor, from one or more databases, historical weather condition data, historical occupancy rates data and historical date data;
   receiving, at the processor, inputs including one or more of: weather condition data, occupancy rates data, and date data, associated with the one or more facilities;
   predicting, at the processor, based on the received inputs and a received reservation request, an energy cost for each workspace area, said predicting comprising:
      running, at the processor, a learning algorithm with the received inputs and the received reservation request in order to determine the energy cost of the each workspace area which corresponds to the received inputs and the received reservation request, wherein said running said learning algorithm comprises:
         running, at the processor, a supervised learning algorithm or a decision tree algorithm in order to find a match between the received inputs and the received reservation request and historical data which includes one or more of: the historical weather condition data, the historical occupancy rates data, the historical date data, and a historical reservation request; and
      deriving, at the processor, based on the found match, the determined energy cost which corresponds to the matched historical data, and wherein the predicting the energy cost of the each workspace area further comprises:
      determining, at the processor, based on the received inputs, the received reservation request, and the found matched historical data, the energy cost of the each workspace area when the each workspace area is occupied by at least one user or no user;
   determining, at the processor, a user desirability value for the each workspace area;
   determining, at the processor, based on the predicted energy cost and the determined user desirability value, a minimum cost for operating the one or more facilities, which satisfies the received reservation request; and
   selecting one or more workspace area in the one or more facilities according to the determined minimum cost and the received reservation request, the selected workspace area having maximum user desirability values,
   wherein a processor connected to a memory device perform the receiving the reservation request, the receiving the inputs, the predicting, the determining the user desirability value, the determining the minimum cost, and the selecting.

2. The method according to claim 1, wherein the weather condition data represents conditions external to the one or more facilities, the conditions including one or more of: an outside temperature range and an amount of cloud coverage in a sky.

3. The method according to claim 1, wherein the received reservation request represents:
   an advanced reservation for workspaces and a total number of workspaces needed.

4. The method according to claim 1, wherein the date data includes:
   an amount of a shade made by one or more building, an angle of sunlight relative to a horizon, and a duration of sunlight.

5. The method according to claim 4, wherein determining the user desirability value further includes:
   receiving, from each user, a survey that includes a rating of comfortability, a rating of an access to amenities, and a rating of satisfaction of a workspace that the each user used.

6. A system for assigning a workspace, the system comprising:

a memory device;
a processor connected to the memory device,
wherein the processor is configured to perform:
receiving one or more reservation requests for the workspace associated with one or more facilities including one or more workspace areas, each workspace area including one or more workspaces;
receiving, from one or more databases, historical weather condition data, historical occupancy rates data and historical date data;
receiving inputs including one or more of: weather condition data, occupancy rates data, and date data, associated with the one or more facilities;
predicting, based on the received inputs and a received reservation request, an energy cost for each workspace area, said predicting comprising:
running a learning algorithm with the received inputs and the received reservation request in order to determine the energy cost of the each workspace area which corresponds to the received inputs and the received reservation request, wherein said running said learning algorithm comprises:
running a supervised learning algorithm or a decision tree algorithm in order to find a match between the received inputs and the received reservation request and historical data which includes one or more of: the historical weather condition data, the historical occupancy rates data, the historical date data, and a historical reservation request; and
deriving based on the found match, the determined energy cost which corresponds to the matched historical data, and wherein the predicting the energy cost of the each workspace area further comprises:
determining based on the received inputs, the received reservation request, and the found matched historical data, the energy cost of the each workspace area when the each workspace area is occupied by at least one user or no user;
determining a user desirability value for the each workspace area;
determining, based on the predicted energy cost and the determined user desirability value, a minimum cost for operating the one or more facilities, which satisfies the received reservation request; and
selecting one or more workspace area in the one or more facilities according to the determined minimum cost and the received reservation request, the selected workspace area having maximum user desirability values.

7. The system according to claim 6, wherein the weather condition data represents conditions external to the one or more facilities, the conditions including one or more of: an outside temperature range and an amount of cloud coverage in a sky.

8. The system according to claim 6, wherein the received reservation request represents:
an advanced reservation for workspaces and a total number of workspaces needed.

9. The system according to claim 6, wherein the date data:
an amount of a shade made by one or more building, an angle of sunlight relative to a horizon, and a duration of sunlight.

10. The system according to claim 9, wherein in order to perform determining the user desirability value, the processor is further configured to perform:
receiving, from each user, a survey that includes a rating of comfortability, a rating of an access to amenities, and a rating of satisfaction of a workspace that the each user used.

11. A computer program product for assigning a workspace, the computer program product comprising a non-transitory computer readable storage medium, the computer readable storage medium readable by a processing circuit and storing instructions run by the processing circuit for performing a method, the method comprising:
receiving one or more reservation requests for the workspace associated with one or more facilities including one or more workspace areas, each workspace area including one or more workspaces;
receiving, from one or more databases, historical weather condition data, historical occupancy rates data and historical date data;
receiving inputs including one or more of: weather condition data, occupancy rates data, and date data, associated with the one or more facilities;
predicting, based on the received inputs and a received reservation request, an energy cost for each workspace area, said predicting comprising:
running a learning algorithm with the received inputs and the received reservation request in order to determine the energy cost of the each workspace area which corresponds to the received inputs and the received reservation request, wherein said running said learning algorithm comprises:
running a supervised learning algorithm or a decision tree algorithm in order to find a match between the received inputs and the received reservation request and historical data which includes one or more of: the historical weather condition data, the historical occupancy rates data, the historical date data, and a historical reservation request; and
deriving based on the found match, the determined energy cost which corresponds to the matched historical data, and wherein the predicting the energy cost of the each workspace area further comprises:
determining based on the received inputs, the received reservation request, and the found matched historical data, the energy cost of the each workspace area when the each workspace area is occupied by at least one user or no user; and
determining a user desirability value for the each workspace area;
determining, based on the predicted energy cost and the determined user desirability value, a minimum cost for operating the one or more facilities, which satisfies the received reservation request; and
selecting one or more workspace area in the one or more facilities according to the determined minimum cost and the received reservation request, the selected workspace area having maximum user desirability values.

* * * * *